United States Patent
Ishibashi et al.

(10) Patent No.: US 7,820,471 B2
(45) Date of Patent: Oct. 26, 2010

(54) PHOTOELECTRIC CONVERSION ELEMENT AND PROCESS FOR FABRICATING THE SAME, ELECTRONIC APPARATUS AND PROCESS FOR FABRICATING THE SAME, AND SEMICONDUCTOR LAYER AND PROCESS FOR FORMING THE SAME

(75) Inventors: Kenichi Ishibashi, Kanagawa (JP); Yuichi Tokita, Kanagawa (JP); Masahiro Morooka, Kanagawa (JP); Yusuke Suzuki, Kanagawa (JP); Kazuhiro Noda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1310 days.

(21) Appl. No.: 10/543,050

(22) PCT Filed: Dec. 26, 2003

(86) PCT No.: PCT/JP03/16938

§ 371 (c)(1), (2), (4) Date: Dec. 12, 2005

(87) PCT Pub. No.: WO2004/068627

PCT Pub. Date: Dec. 8, 2004

(65) Prior Publication Data

US 2006/0185717 A1 Aug. 24, 2006

(30) Foreign Application Priority Data

Jan. 30, 2003 (JP) ............................. 2003-21410

(51) Int. Cl.
*H01L 21/00* (2006.01)
(52) U.S. Cl. ................. 438/63; 438/85; 257/436; 257/E21.002; 136/250
(58) Field of Classification Search ............. 438/63, 438/85; 257/431, 436, 435, E21.002; 136/250
See application file for complete search history.

(56) References Cited

U.S. PATENT DOCUMENTS 5,320,723 A 6/1994 Kawakami (Continued)

FOREIGN PATENT DOCUMENTS

EP 1 058 260 A1 12/2000

(Continued)

OTHER PUBLICATIONS

Tachibana, Y. et al., "Electron Injection and Recombination in Dye Sensitized Nanocrystalline Titanium Dioxide Films: A Comparison of Ruthenium Bipyridyl and Porphyrin Sensitizer Dyes," J. Phys. Chem. B, 2000, pp. 1198-1205, vol. 104.

(Continued)

*Primary Examiner*—Kiesha R Bryant
*Assistant Examiner*—Christy L Novacek
(74) *Attorney, Agent, or Firm*—Wolf, Greenfield & Sacks, P.C.

(57) ABSTRACT

A paste in which semiconductor fine grain such as titanium oxide fine grain or the like and a binder made of a polymer compound are mixed is coated onto a transparent conductive substrate and sintered, thereby forming a semiconductor layer made of the semiconductor fine grain, after that, ultraviolet rays are irradiated to the semiconductor layer and, by using a photocatalyst effect of the semiconductor fine grain, an organic substance remaining in the semiconductor layer is removed.

14 Claims, 2 Drawing Sheets

U.S. PATENT DOCUMENTS

| | | | |
|---|---|---|---|
| 5,350,644 A | 9/1994 | Graetzel et al. | |
| 5,940,550 A | 8/1999 | Plickert et al. | |
| 6,100,466 A * | 8/2000 | Nishimoto | 136/258 |
| 6,261,684 B1 | 7/2001 | Takahashi et al. | |
| 6,291,763 B1 | 9/2001 | Nakamura | |
| 6,350,946 B1 | 2/2002 | Miyake et al. | |
| 6,376,765 B1 | 4/2002 | Wariishi et al. | |
| 6,586,670 B2 | 7/2003 | Yoshikawa | |
| 6,602,998 B2 | 8/2003 | Kobuke et al. | |
| 6,766,817 B2 | 7/2004 | Silva | |
| 6,852,555 B1 | 2/2005 | Roman et al. | |
| 6,911,595 B2 | 6/2005 | Yoshikawa et al. | |
| 6,929,970 B2 | 8/2005 | Andriessen et al. | |
| 2001/0027252 A1 | 10/2001 | Kobuke et al. | |
| 2001/0029975 A1 | 10/2001 | Takehama et al. | |
| 2002/0015881 A1 | 2/2002 | Nakamura | |
| 2002/0031080 A1 | 3/2002 | Inoue | |
| 2003/0183271 A1 | 10/2003 | Ikeda et al. | |
| 2003/0188776 A1 | 10/2003 | Li et al. | |
| 2003/0230337 A1 | 12/2003 | Gaudiana et al. | |
| 2004/0202064 A1 | 10/2004 | Inoue et al. | |
| 2004/0250267 A1 | 12/2004 | Tsutsumi et al. | |
| 2004/0251508 A1 | 12/2004 | Tomita | |
| 2005/0016578 A1 | 1/2005 | Enomoto | |
| 2005/0022221 A1 | 1/2005 | Inatani et al. | |
| 2005/0218467 A1 | 10/2005 | Tomita | |
| 2005/0224112 A1 | 10/2005 | Tokita et al. | |
| 2006/0048812 A1 | 3/2006 | Tomita | |
| 2006/0084257 A1 | 4/2006 | Tokita | |
| 2006/0107994 A1 | 5/2006 | Morooka et al. | |
| 2006/0112988 A1 | 6/2006 | Morooka | |
| 2006/0137739 A1 | 6/2006 | Imoto et al. | |

FOREIGN PATENT DOCUMENTS

| | | |
|---|---|---|
| EP | 1 100 086 A2 | 5/2001 |
| EP | 1 152 418 A1 | 11/2001 |
| EP | 1 156 488 A2 | 11/2001 |
| EP | 1 431 971 A1 | 6/2004 |
| JP | 10-209048 A | 8/1998 |
| JP | 10-233238 A | 9/1998 |
| JP | 10-255863 A | 9/1998 |
| JP | 10-255863 A1 | 9/1998 |
| JP | 10-334954 A | 12/1998 |
| JP | 11-167937 A | 6/1999 |
| JP | 11-354169 A | 12/1999 |
| JP | 2000-082506 A | 3/2000 |
| JP | 2000-100484 A | 4/2000 |
| JP | 2000-106222 A | 4/2000 |
| JP | 2000-195569 A | 7/2000 |
| JP | 2000-231942 A | 8/2000 |
| JP | 2000-243463 A | 9/2000 |
| JP | 2000-268890 A | 9/2000 |
| JP | 2000-268891 A | 9/2000 |
| JP | 2000-285975 A | 10/2000 |
| JP | 2001-093589 A | 4/2001 |
| JP | 2001-093591 A | 4/2001 |
| JP | 2001-93591 A | 4/2001 |
| JP | 2001-111074 A | 4/2001 |
| JP | 2001-143771 A | 5/2001 |
| JP | 2001-247314 A | 9/2001 |
| JP | 2001-247546 A | 9/2001 |
| JP | 2001-253883 A | 9/2001 |
| JP | 2001-319698 A | 11/2001 |
| JP | 2001-357896 A | 12/2001 |
| JP | 2002-8740 A | 1/2002 |
| JP | 2002-008740 A | 1/2002 |
| JP | 2002-008741 A | 1/2002 |
| JP | 2002-8741 A | 1/2002 |
| JP | 2002-25635 A | 1/2002 |
| JP | 2002-025635 A | 1/2002 |
| JP | 2002-063949 A | 2/2002 |
| JP | 2002-175843 A | 6/2002 |
| JP | 2002-222971 A | 8/2002 |
| JP | 2002-231942 A | 8/2002 |
| JP | 2002-289269 A | 10/2002 |
| JP | 2002-289269 A1 | 10/2002 |
| JP | 2002-289274 A | 10/2002 |
| JP | 2002-298646 A | 10/2002 |
| JP | 2002-319689 A | 10/2002 |
| JP | 2002-334729 A | 11/2002 |
| JP | 2002-352868 A | 12/2002 |
| JP | 2002-352869 A | 12/2002 |
| JP | 2002-352870 A | 12/2002 |
| JP | 2002-353432 A | 12/2002 |
| WO | WO 02/14322 | 2/2002 |
| WO | WO 02/071530 A1 | 9/2002 |

OTHER PUBLICATIONS

Optoelectronic. (2001). In Hargrave's Communications Dictionary, Wiley. Retrieved Dec. 18, 2007 from http://www.credoreference.com/entry/2723224.

Ma, Tingli, et al. "Recent Advances in Research and Development for Dye-Sensitized Solar Cells: Development of Porphyrin-Sensitized Solar Cells," May 25, 2000, Chapter 15, Kurashiki Printing Co., Ltd., Osaka, Japan.

Imahori, Hiroshi, "Recent Advances in Research and Development for Dye-Sensitized Solar Cells: Photoelectric Conversion by Electrode Bonded with Monomolecular Film of Porphyrin," May 25, 2000, Chapter 32, Kurashiki Printing Co., Ltd., Osaka, Japan.

Meinhardt et al. "Optoelectronic Device made from Multilayer and Molecularly Doped Organic Layers," SPIE Conference on Organic Photonic Materials and Devices vol. 3623, Jan. 1999, pp. 46-57.

http://server2.idtechex.com/products/en/presentation.asp?presentationid=646 : Accessed on Jan. 31, 2008.

U.S. Appl. No. 10/541,877, filed Jul. 8, 2005, Masahiro Morooka et al.

U.S. Appl. No. 10/542,193, filed Jul. 14, 2005, Masahiro Morooka.

Uchida, Satoshi, "Application of Titania Nanotubes to A Dye-Sensitized Solar Cell," ElectroChemistry, Jun. 2002, vol. 70; No. 6, pp. 418-420.

Adachi, Motonari, "Dye-Sensitized Solar Cells Using Semiconductor Thin Film Composed of Titania Nanotubes," Electrochemistry, Jun. 2002, vol. 70, No. 6, pp. 449-452.

Adachi, Motonari, "Formation, Characterization, and Functions of Ceramic Nanotubes," Transactions of the Materials Research Society of Japan, Sep. 2002, vol. 27, No. 3, pp. 505-508.

Ngamsinlapasathian, S., "Higher Efficiency in Dye-Sensitized Solar Cells Using Titania Nanotube,"2002 Nen Denki Kagaku Shuki Taikai Koen Yoshishu, Sep. 2002, p. 138.

E-mail from Silva, E ; "US 20060107994—Requesting IDS of 6,766,817"; May 25, 2006.

E-mail from Silva, E ; "US 20050016578—Requesting IDS of 6,766,817"; May 25, 2006.

* cited by examiner

PHOTOELECTRIC CONVERSION ELEMENT AND PROCESS FOR FABRICATING THE SAME, ELECTRONIC APPARATUS AND PROCESS FOR FABRICATING THE SAME, AND SEMICONDUCTOR LAYER AND PROCESS FOR FORMING THE SAME

TECHNICAL FIELD

The invention relates to a photoelectric conversion device, its manufacturing method, an electronic apparatus, its manufacturing method, a semiconductor layer, and its manufacturing method and is suitable when it is applied to, for example, a photoelectric conversion device using a semiconductor layer made of semiconductor fine grain, particularly, a semiconductor layer made of semiconductor fine grain sensitized by dye.

BACKGROUND ART

Since a solar cell as a photoelectric conversion device to convert sunlight into an electric energy uses the sunlight as an energy source, an influence that is exercises to the global environment is extremely small and it is expected to be spread further.

Various materials have been examined as a material of the solar cell and a number of solar cells using silicon have been commercialized. They are mainly classified into: a crystalline silicon solar cell using single crystal silicon or poly crystal silicon; and an amorphous silicon solar cell. Hitherto single crystal silicon or poly crystal silicon, that is, crystalline silicon has often been used for the solar cells.

However, in the crystalline silicon solar cell, although photoelectric conversion efficiency indicative of performance of converting the light (solar) energy into the electric energy is higher than that of the amorphous silicon solar cell, since a large energy and a long time are required for a crystal growth, productivity is low and it is disadvantageous in terms of costs.

Although higher light absorptivity, wider selecting range of a substrate, easier realization of a large area, and the like are characteristics of the amorphous silicon solar cell than in the case of the crystalline silicon solar cell, the photoelectric conversion efficiency is lower than that of the crystalline silicon solar cell. Further, in the amorphous silicon solar cell, although the productivity is higher than that of the crystalline silicon solar cell, a vacuum process is necessary upon manufacturing in a manner similar to the crystalline silicon solar cell and a facility related cost is still heavy.

In order to solve the above problems and realize the even lower costs of the solar cell, solar cells using an organic material in place of a silicon material have been studied for a long time. However, since most of those solar cells have the low photoelectric conversion efficiency of about 1%, they are not put into practical use.

Among them, according to the dye sensitized solar cell proposed by Glötzl et al. in 1991, since it is reasonable in price, shows the high photoelectric conversion efficiency and, unlike the conventional silicon solar cell, a large apparatus is unnecessary upon manufacturing, and the like, attention has been paid (for example, Nature, 353, p. 737 (1991)).

According to a general structure of such a dye sensitized solar cell, a semiconductor porous electrode in which a sensitizing dye is combined with a semiconductor porous membrane of a titanium oxide or the like formed on a transparent conductive substrate and a counter electrode obtained by forming a platinum layer or the like onto the substrate are combined, and an organic electrolytic solution containing redox species such as iodine, iodide ions, or the like is filled between both electrodes.

The semiconductor porous electrode which is used can be obtained by a method whereby semiconductor fine grain (titanium oxide fine grain or the like) and a polymer compound such as polyethylene glycol, polystyrene, or the like serving as a binder are mixed, coated onto the transparent conductive substrate by a doctor blade method, a spin coating method, a dip coating method, or the like, and thereafter, sintered at temperatures of 400 to 500° C. for 30 minutes to one hour. The semiconductor porous electrode is constructed by a semiconductor layer (or semiconductor thin film) made of semiconductor fine grain having a fine grain diameter of about 20 to 30 nm and has a structure in which many fine holes in that a diameter of tens of nm is set to the center of distribution exist in the electrode. The titanium oxide porous electrode as a semiconductor porous electrode suitable for the photoelectric conversion device among them is an anatase-type fine grain thin film in which a grain diameter is small, a specific surface area is large, and a photocatalyst activity is high.

It has been reported that if the semiconductor fine grain is made of the titanium oxide, its surface changes to the surface having hydrophilicity (surface hydroxyl group increases) by irradiating ultraviolet rays (Nature, 388, p. 431 (1999)).

However, according to the knowledge obtained uniquely by the inventors et al. of the present invention, it has been found that if a sintering temperature is lowered or a sintering time is shortened in order to suppress the crystal growth and keep the crystal grain diameter small, a large amount of organic substance derived from the polymer compound used as a binder remains in the semiconductor porous electrode. This obstructs combination of the semiconductor fine grain, resulting in deterioration of the photoelectric conversion efficiency. On the contrary, if the sintering temperature is raised or the sintering time is extended in order to reduce the residual amount of the organic substance, the crystal grain diameter increases, the specific surface area decreases, and the structure changes to the crystalline structure in which the photocatalyst activity is low (in the case of titanium oxide, rutile type). Also in this case, the photoelectric conversion efficiency deteriorates.

Therefore, the problem to be solved by the invention is to provide a photoelectric conversion device which has such a crystalline structure (for example, an anatase type in the case of titanium oxide) that an amount of residual organic substance in a semiconductor layer made of semiconductor fine grain is extremely small, a crystal grain diameter of the semiconductor layer is small, a specific surface area is large, and a photocatalyst activity is high and whose photoelectric conversion efficiency is high and to provide a manufacturing method of such a device.

More generally, the problem to be solved by the invention is to provide an electronic apparatus which has such a crystalline structure that an amount of residual organic substance in a semiconductor layer made of semiconductor fine grain is extremely small, a crystal grain diameter of the semiconductor layer is small, a specific surface area is large, and a photocatalyst activity is high and whose characteristics are excellent and to provide a manufacturing method of such an electronic apparatus.

DISCLOSURE OF INVENTION

To solve the above problem, according to the first invention of the invention, there is provided a manufacturing method of a photoelectric conversion device, whereby a paste in which semiconductor fine grain and a binder made of a polymer compound are mixed is coated onto a transparent conductive substrate and sintered, thereby forming a semiconductor layer made of the semiconductor fine grain, wherein after the semiconductor layer is formed, ultraviolet rays are irradiated to the semiconductor layer and, by using a photocatalyst effect of the semiconductor fine grain, an organic substance remaining in the semiconductor layer is removed.

According to the second invention of the invention, there is provided a photoelectric conversion device using a semiconductor layer made of semiconductor fine grain, wherein a paste in which the semiconductor fine grain and a binder made of a polymer compound are mixed is coated onto a transparent conductive substrate and sintered, thereby forming the semiconductor layer made of the semiconductor fine grain, after that, ultraviolet rays are irradiated to the semiconductor layer and, by using a photocatalyst effect of the semiconductor fine grain, an organic substance remaining in the semiconductor layer is removed.

According to the third invention of the invention, there is provided a photoelectric conversion device using a semiconductor layer made of semiconductor fine grain, wherein an organic substance does not substantially remain in the semiconductor layer.

Specific examples of the residual amount of the organic substance in the semiconductor layer will be mentioned. In general, a content of a carbon compound of the semiconductor layer is equal to 1 atom % or less, preferably, 0.6 atom % or less, more preferably, 0.3 atom % or less, and further preferably, 0.1 atom % or less.

In the first to third inventions, it is desirable that the semiconductor fine grain is a semiconductor which causes holes or active oxygen species trapped on the surface under the light excitation and exhibits the photocatalyst activity. One kind or two or more kinds of semiconductor fine grain showing the photocatalyst activity are used. Specifically speaking, the semiconductor fine grain showing the photocatalyst activity comprises, for example, titanium oxide (particularly preferably, titanium oxide having a crystalline structure of the anatase type), zinc oxide, strontium titanate, or the like.

Although the grain diameter of the semiconductor fine grain is not particularly limited, it is preferable to set the mean grain diameter of the primary particle to 1 to 200 nm, particularly preferably, 5 to 100 nm. It is also possible to mix semiconductor fine grain whose mean grain diameter is larger than such a mean grain diameter to the semiconductor fine grain of such a mean grain diameter, scatter incident light by the semiconductor fine grain of large mean grain diameters, and improve quantum efficiency. In this case, it is desirable that the mean grain diameter of the semiconductor fine grain to be additionally mixed is equal to 20 to 500 nm.

Generally, the more a thickness of semiconductor layer comprising the semiconductor fine grain increases, the more an amount of adsorbed dye per unit projection area increases, so that a capturing ratio of the light rises. However, since a diffusion length of the injected electrons increases, a loss caused by charge recombination also increases. Therefore, although a preferable thickness of semiconductor layer exists, it is generally equal to 0.1 to 100 µm, preferably, 1 to 50 µm, particularly preferably, 3 to 30 µm. To increase a surface area of the semiconductor fine grain, remove impurities of the semiconductor layer made of the semiconductor fine grain, and raise electron injecting efficiency upon injecting electrons from the dye into the semiconductor fine grain, for example, a chemical process using a titanium tetrachloride aqueous solution or an electrochemical process using a titanium trichloride aqueous solution can be also performed. A conductive assistant can be also added to reduce an impedance of the semiconductor layer made of the semiconductor fine grain.

It is preferable that the binder made of the polymer compound to be added to the paste is insoluble to a dye solution upon dye dyeing or an electrolyte. However, if the binder can be preliminarily removed by sintering or irradiating the ultraviolet rays, the binder is not always necessary to be insoluble. A well-known compound can be used as a polymer compound. Although a cellulose, a polyether, polyvinyl alcohol, polyacrylic acid, polyacrylamide, polyethylene glycol, polystyrene, polyethylene imine, poly(metha)methyl acrylate, polyvinylidene fluoride, styrene-butadiene rubber, polyamideimide, polytetrafluoroethylene (fluororesin), and the like can be mentioned, the invention is not limited to them. Two or more kinds of them can be also mixed and used. A compound superior in improving viscosity is preferable as a polymer compound. Specifically speaking, polyethylene glycol, polystyrene, or the like can be mentioned.

Although a manufacturing method of the paste in which the semiconductor fine grain and the binder made of the polymer compound have been mixed is not particularly limited, a wet-type film forming method is preferable in consideration of physical property, use efficiency, manufacturing costs, and the like and a method whereby powder or sol of the semiconductor fine grain is uniformly distributed into a solvent such as water or the like, the binder is further added thereto, and the paste is adjusted and coated onto the transparent conductive substrate. A coating method is not particularly limited and the coating process can be performed by a well-known method. For example, it can be performed by the following various methods: a dipping method; a spraying method; a wire bar method; a spin coating method; a roller coating method; a blade coating method; a gravure coating method; and a wet-type printing method such as anastatic printing, offset, gravure, copperplate printing, rubber printing, screen printing, and the like. A commercially available powder, sol, or slurry can be used as anatase-type titanium oxide or the anatase-type titanium oxide having a predetermined grain diameter can be also formed by a well-known method whereby titanium oxide alkoxide is hydrolyzed or the like. In the case of using the commercially available powder, it is preferable to dissolve the secondary aggregation of the particles and it is desirable to mill the particles by using a mortar, a ball mill, or the like at the time of the adjustment of a coating liquid. At this time, to prevent that the particles whose secondary aggregation has been dissolved is reaggregated, acetyl acetone, acid such as hydrochloric acid, nitric acid, or the like, alkali, a surface active agent, a chelating agent, or the like can be added.

After coating the paste in which the semiconductor fine grain and the binder made of the polymer compound have been mixed, ordinarily, the paste is dried in order to remove the solvent contained in the paste. A drying temperature is equal to or lower than a boiling point of the solvent and is generally set to, for example, about 50° C. when the solvent is a water and to about 80° C. when the solvent is an organic solvent.

As ultraviolet rays to be irradiated to the semiconductor layer, the ultraviolet rays having an arbitrary wavelength can be fundamentally used so long as its photon energy is equal to or higher than a band gap energy of the semiconductor fine grain which is used. As a light source of the ultraviolet rays, any light source can be fundamentally used. Any one of a lamp light source, a semiconductor light source (semiconductor laser, light emitting diode), laser light source (excimer laser or the like) other than the semiconductor laser, and the like can be used. Specifically speaking, ultraviolet rays (wavelength is equal to 254 nm, 303 nm, 313 nm, 365 nm, or the like: mainly, 365 nm) by an extra-high pressure mercury lamp or the like can be given.

The dye to be adsorbed to the semiconductor fine grain is not particularly limited so long as it has a charge separating function and shows a sensitizing function. For example, there can be mentioned: an xanthene-based dye such as rhodamine B, rose bengal, eosin, Erythrocin, or the like; a cyanine-based dye such as quinocyanine, cryptcyanine, or the like; a basic dye such as phenosafranine, Capri blue, thiocin, methylene blue, or the like; a porphyrin-based compound such as chlorophyll, zinc porphyrin, magnesium porphyrin, or the like; azo dye; a phthalocyanine compound; a coumalin-based compound; a complex compound such as ruthenium (Ru) tris bipyridyl, or the like; anthraquinone-based dye; a polycyclic quinone-based dye; a coumalin-based dye; etc. Among them, although the Ru tris bipyridyl complex compound is particularly preferable since its quantum efficiency is high, the invention is not limited to it. One of those dyes can be solely used or a combination obtained by mixing two or more kinds of those dyes can be used.

An adsorbing method of the dye to the semiconductor fine grain is not particularly limited. For example, there is generally used a method whereby the dye is dissolved into a solvent such as alcohols, nitryls, nitromethane, hydrocarbon halide, ether, dimethyl sulfoxide, amides, N-methylpyrrolidone, 1,3-dimethyl imidazolidinone, 3-methyl oxazolidinone, ester, carbonates, ketones, hydrocarbon, water, or the like and the semiconductor layer made of the semiconductor fine grain is dipped into the resultant solvent or the semiconductor layer made of the semiconductor fine grain is coated with a dye solution. In this case, an amount of dye molecules into one semiconductor fine grain is equal to 1 to 1000 molecules and, further preferably, 1 to 100 molecules. When the dye molecules are remarkably and excessively adsorbed to the semiconductor fine grain, the electrons excited by the light energy are not injected into the semiconductor fine grain but reduce the electrolyte, so that they become a cause for the energy loss. Therefore, as for the dye molecules, monomolecular adsorption to the semiconductor fine grain is in an ideal state and a temperature and a pressure for adsorbing them can be changed as necessary. A carboxylic acid such as deoxycholic acid or the like can be also added to reduce aggregation of the dyes. An ultraviolet ray absorbent can be also used together with it.

To promote the removal of the dyes which have excessively been adsorbed, the surface of the semiconductor layer made of the semiconductor fine grain on which the dyes have been adsorbed can be also processed by using an organic substance such as amines, acetonitrile, or the like. Pyridine, 4-tert-butyl pyridine, polyvinyl pyridine, or the like can be given as an example of the amines. If each of them is in a liquid state, it can be used as it is or can be dissolved into an organic solvent and used.

As a transparent conductive substrate, it can be realized by forming a transparent electrode (transparent conductive film) onto a conductive or non-conductive transparent supporting substrate or can be realized by forming a transparent substrate which is conductive as a whole. A material of the transparent supporting substrate or the transparent substrate is not particularly limited and various base materials can be used so long as they are transparent or they are transparent and have the conductivity. As a transparent supporting substrate or a transparent substrate, it is preferable to use a substrate which is excellent in terms of shutdown performance against the moisture or gases which enter from an outside of the photoelectric conversion device, durability against solvents and circumstances, and the like. Specifically speaking, there can be mentioned: a transparent inorganic substrate such as quartz, glass, or the like; and a transparent plastic substrate made of polyethylene telephthalate, polyethylene naphthalate, polycarbonate, polystyrene, polyethylene, polypropylene, polyphenylene sulfide, polyvinylidene fluoride, tetraacetylcellulose, phenoxy bromide, aramids, polyimides, polystyrenes, polyarylates, polysulfones, polyolefins, or the like. However, the invention is not limited to them. From viewpoints of workability, light-weight performance, and the like, it is preferable to use the transparent plastic substrate as a transparent supporting substrate or a transparent substrate. A thickness of transparent supporting substrate or transparent substrate is not particularly limited and an arbitrary value can be selected in dependence on light transmittance, the shutdown performance between the inside and the outside of the photoelectric conversion device, and the like.

A smaller sheet resistance of the transparent conductive substrate is better. Specifically speaking, the sheet resistance of the transparent conductive substrate is preferably set to 500 $\Omega/cm^2$ or less, more preferably, 10 $\Omega/cm^2$ or less. In the case of forming the transparent electrode onto the transparent supporting substrate, any type of material can be fundamentally used so long as it has the conductivity and transparency. However, it is desirable to use indium-tin composite oxide (ITO), fluorine doped $SnO_2$ (FTO), $SnO_2$, or the like from a viewpoint that they have the conductivity, transparency, and further, heat resistance at high levels. ITO is preferable among them in consideration of the costs. It is also possible to combine two or more kinds of those materials and use them. To reduce the sheet resistance of the transparent conductive substrate and improve the collecting efficiency, metal wirings having the high conductivity can be also patterned onto the transparent conductive substrate.

An arbitrary electrode can be used as a counter electrode so long as it is made of a conductive substance. An insulative substance can be also used so long as a conductive layer is formed on the side where it faces the semiconductor layer. However, it is desirable that a material which is electrochemically stable is used as an electrode material. Specifically speaking, it is preferable to use platinum, gold, conductive polymer, carbon, or the like. To improve the catalyst effect of the redox reaction, it is desirable that the electrode on the side where it faces the semiconductor layer has a fine structure and its surface is increased. For example, in the case of platinum, it is desirable to be in the platinum black state and in the case of carbon, it is desirable to be in the porous state. The platinum black state can be formed by an anode oxidizing method, a platinum chloride acid treatment, or the like of platinum. Carbon in the porous state can be formed by a method of sintering carbon fine grain, a method of sintering an organic polymer, or the like.

The electrolyte becomes a carrier transfer layer and is constructed by a redox species and a solvent. Specifically speaking, the redox species is constructed by, for example, a combination of iodine ($I_2$) and an iodine compound (metal iodide, organic iodide, or the like) or a combination of bromine ($Br_2$) and a bromine compound (metal bromide, organic bromide, or the like). Further, there can be used: metal complexes such as ferrocianic acid salt/ferricianic acid salt, ferrocene/ferricynium ions, or the like; sulfur compounds such as polysodium sulfide, alkylthiol/alkyl disulfide, or the like; viologen dye; hydroquinone/quinone; or the like. As cations of the above metal compound, it is suitable to use Li, Na, K, Mg, Ca, Cs, etc. As cations of the above organic compound, it is suitable to use a quaternary ammonium compound such as tetraalkyl ammoniums, pyridinums, imidazoliums, or the like. However, the cations are not limited to them and it is also possible to combine two or more kinds of those elements and use the mixture as necessary. Among them, an electrolyte obtained by combining $I_2$ with quaternary ammonium compound such as LiI, NaI, imidazolium iodide, or the like is suitable. A concentration of electrolyte salt is preferably set to 0.05 to 5 M for the solvent and, further preferably, 0.2 to 1 M. A concentration of $I_2$ or $Br_2$ is preferably set to 0.0005 to 1 M and, further preferably, 0.0001 to 0.1 M. To improve a release voltage and a short-circuit current, various additives such as 4-tert-butyl pyridine, 2-n-propyl pyridine, carboxylic acid, and the like can be also added.

As a solvent constructing the electrolyte compositions mentioned above, the following elements can be mentioned: water; an alcohol; an ether; ester; a carbonate; a lactone; a carboxylic acid ester; a triester phosphate; a heterocyclic compound; a nitrile; a ketone; an amide; nitromethane; halogenated hydrocarbon; dimethylsulfoxide; sulfolane; N-methyl pyrolidone; 1,3-dimethyl imidazolidinone; 3-methyl oxazolidinone; hydrocarbon; and the like. However, the invention is not limited to them and one kind of those elements can be solely used or two or more kinds of those elements can be mixed and used. A room temperature ionic liquid of a quaternary ammonium salt of a tetraalkyl, a pyridinium, or an imidazolium can be also used as a solvent.

To reduce a leakage liquid of the photoelectric conversion device and volatilization of the electrolyte, gelatinizer, polymer, cross linking monomer, or the like is dissolved in the electrolyte compositions and can be used as a gel electrolyte. As for a ratio of a gel matrix and the electrolyte compositions, if an amount of electrolyte compositions is large, ion conductivity increases but a mechanical strength decreases. On the contrary, if the amount of electrolyte compositions is too small, although the mechanical strength is large, the ion conductivity decreases. Therefore, it is desirable that the amount of electrolyte compositions is equal to 50 to 99 wt % of the gel electrolyte and, more preferably, 80 to 97 wt %. The photoelectric conversion device of a total solid type can be also realized by dissolving the electrolyte and a plasticizer into the polymer and volatilizing and removing the plasticizer.

Although a manufacturing method of the photoelectric conversion device is not particularly limited, for example, the electrolyte compositions can be in the liquid state or can be gelatinized in the photoelectric conversion device. If the electrolyte compositions is in the liquid state before introduction, the semiconductor layer and the counter electrode are allowed to face each other and the substrate portion in which the semiconductor layer is not formed is sealed lest the two electrodes are come into contact with each other. At this time, although a gap between the semiconductor layer and the counter electrode is not particularly limited, it is ordinarily set to 1 to 100 μm and, more preferably, 1 to 50 μm. If a distance between the electrodes is too long, the photocurrent decreases due to the decrease of the conductivity. Although a sealing method is not particularly limited, a material having light resistance, insulation resistance, and moisture resistance is preferable, various welding methods, an epoxy resin, an ultraviolet curing resin, an acrylic adhesive agent, EVA (ethylene-vinyl acetate), an ionomer resin, ceramics, a heat melt-bonding film, and the like can be used. Although an injection port to inject the solution of the electrolyte compositions is necessary, a location of the injection port is not particularly limited so long as it is not arranged on the semiconductor layer and the counter electrode in the portion which faces it. Although a liquid injecting method is not particularly limited, a method of injecting the liquid into the cell which has previously been sealed and in which the injection port of the solution is opened is preferable. In this case, a method of dropping a few droplets of the solution into the injection port and injecting the liquid by a capillary tube phenomenon is simple. The liquid injecting operation can be also performed under a reduced pressure or a heating state as necessary. After the solution is completely injected, the solution remaining in the injection port is removed and the injection port is sealed. This sealing method is not particularly limited as well and a glass plate or a plastic substrate can be also adhered and sealed with a sealing agent as necessary. In the case of the gel electrolyte using polymer or the like or the electrolyte of a total solid type, the polymer solution containing the electrolyte compositions and plasticizer is volatilized and removed by a casting method on the semiconductor electrode adsorbing the dye. After the plasticizer is completely removed, the sealing is performed in a manner similar to that mentioned above. It is preferable to perform the sealing under an inert gas atmosphere or in the reduced pressure by using a vacuum sealer or the like. After the sealing is performed, the heating and pressurizing operations can be also performed as necessary in order to sufficiently dip the electrolyte into the semiconductor layer.

The photoelectric conversion devices can be manufactured in various shapes in accordance with the application and their shapes are not particularly limited.

The method whereby after the semiconductor layer made of the semiconductor fine grain is formed, the ultraviolet rays are irradiated to the semiconductor layer and, by using the photocatalyst effect of the semiconductor fine grain, the organic substance remaining in the semiconductor layer is removed can be applied not only to the photoelectric conversion device but also all electronic apparatuses each using the semiconductor layer made of the semiconductor fine grain.

According to the fourth invention of the invention, there is provided a manufacturing method of an electronic apparatus, whereby a paste in which semiconductor fine grain and a binder made of a polymer compound are mixed is coated onto a substrate and sintered, thereby forming a semiconductor layer made of the semiconductor fine grain, wherein after the semiconductor layer is formed, ultraviolet rays are irradiated to the semiconductor layer and, by using a photocatalyst effect of the semiconductor fine grain, an organic substance remaining in the semiconductor layer is removed.

According to the fifth invention of the invention, there is provided an electronic apparatus using a semiconductor layer made of semiconductor fine grain, wherein a paste in which the semiconductor fine grain and a binder made of a polymer compound are mixed is coated onto a substrate and sintered, thereby forming the semiconductor layer made of the semiconductor fine grain, after that, ultraviolet rays are irradiated to the semiconductor layer and, by using a photocatalyst effect of the semiconductor fine grain, an organic substance remaining in the semiconductor layer is removed.

According to the sixth invention of the invention, there is provided an electronic apparatus using a semiconductor layer made of semiconductor fine grain, wherein an organic substance does not substantially remain in the semiconductor layer.

The contents disclosed in conjunction with the first to third inventions are also similarly applied to the fourth to sixth inventions so long as they are not contradictory to the spirit of them. However, it is not always necessary that the substrate on which the semiconductor layer is formed has the conductivity and the transparency in dependence on the application or function of the electronic apparatus.

Further, according to the seventh invention of the invention, there is provided a manufacturing method of a semiconductor layer, whereby a paste in which semiconductor fine grain and a binder made of a polymer compound are mixed is coated onto a substrate and sintered, thereby forming the semiconductor layer made of the semiconductor fine grain, wherein after the semiconductor layer is formed, ultraviolet rays are irradiated to the semiconductor layer and, by using a photocatalyst effect of the semiconductor fine grain, an organic substance remaining in the semiconductor layer is removed.

According to the eighth invention of the invention, there is provided a semiconductor layer made of semiconductor fine grain, wherein a paste in which the semiconductor fine grain and a binder made of a polymer compound are mixed is coated onto a substrate and sintered, thereby forming the semiconductor layer made of the semiconductor fine grain, after that, ultraviolet rays are irradiated to the semiconductor layer and, by using a photocatalyst effect of the semiconductor fine grain, an organic substance remaining in the semiconductor layer is removed.

According to the ninth invention of the invention, there is provided a semiconductor layer made of semiconductor fine grain, wherein an organic substance does not substantially remain in the semiconductor layer.

The contents disclosed in conjunction with the first to third inventions are also similarly applied to the seventh to ninth inventions so long as they are not contradictory to the spirit of them. However, it is not always necessary that the substrate on which the semiconductor layer is formed has the conductivity and the transparency.

According to the invention constructed as mentioned above, the paste in which the semiconductor fine grain and the binder made of the polymer compound are mixed is coated and sintered, thereby forming the semiconductor layer made of the semiconductor fine grain. After that, by irradiating the ultraviolet rays to the semiconductor layer, the organic substance remaining in the semiconductor layer is oxidization dissolved by the photocatalyst effect of the semiconductor fine grain, becomes carbon dioxide, water, and the like, and is removed. Particularly, by sufficiently irradiating the ultraviolet rays, it is possible to realize the state where the organic substance does not substantially remain in the semiconductor layer. As disclosed in Non-Patent Document 2, if the semiconductor fine grain is made of titanium oxide, the surface changes to the surface having hydrophilicity (the surface hydroxyl group increases), so that a binding force between the semiconductor fine grain increases and the electron movement between the semiconductor fine grain becomes easy. At the same time, if the semiconductor fine grain is made of titanium oxide, a coupling force between the sensitizing dye and a carboxyl group is also increased due to an increase in surface hydroxyl group. The electron movement between the dye and the semiconductor fine grain made of titanium oxide also becomes easy. Consequently, the photoelectric conversion efficiency is improved.

BEST MODE FOR CARRYING OUT THE INVENTION

An embodiment of the invention will be described hereinbelow with reference to the drawings.

Figure 1:
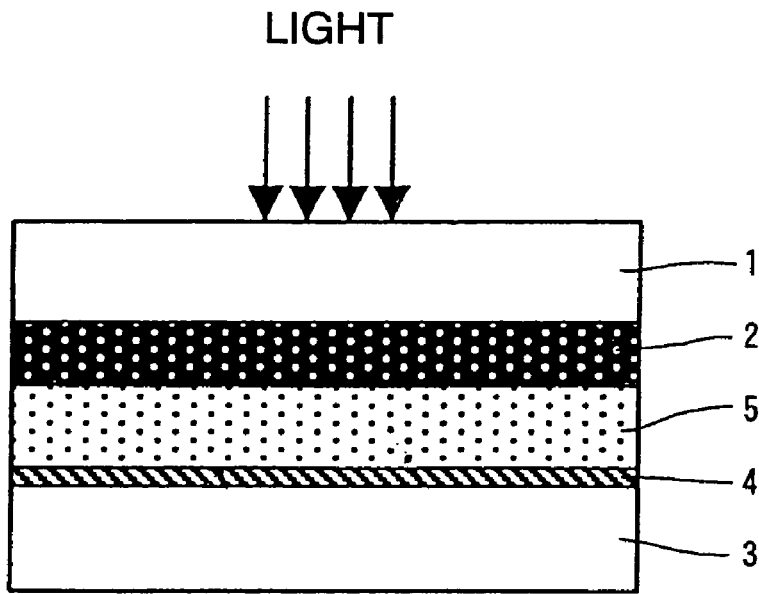
FIG. 1 is a cross sectional view of a main portion of a dye sensitized wet-type photoelectric conversion device according to an embodiment of the invention.

FIG. 1 shows a dye sensitized wet-type photoelectric conversion device according to an embodiment of the invention.

As shown in FIG. 1, in the dye sensitized wet-type photoelectric conversion device, an assembly obtained by forming a semiconductor layer 2 (semiconductor electrode) made of semiconductor fine grain which adsorbs dye and exhibits a photocatalyst activity onto a transparent conductive substrate 1 and a counter electrode obtained by forming a platinum layer 4 onto a transparent substrate 3 are arranged so that the semiconductor layer 2 and the platinum layer 4 face each other at a predetermined interval. An electrolyte layer (electrolytic solution) 5 is sealed in a space between them. The electrolyte layer 5 is sealed by a predetermined sealing member (not shown). The semiconductor layer 2 is constructed in such a manner that a paste in which semiconductor fine grain exhibiting the photocatalyst activity and a binder made of a polymer compound are mixed is coated onto the transparent electrode 2 and sintered, further, ultraviolet rays are irradiated, an organic substance remaining in the semiconductor layer is removed, and thereafter, the sensitizing dye is adsorbed to the semiconductor fine grain.

Figure 2:
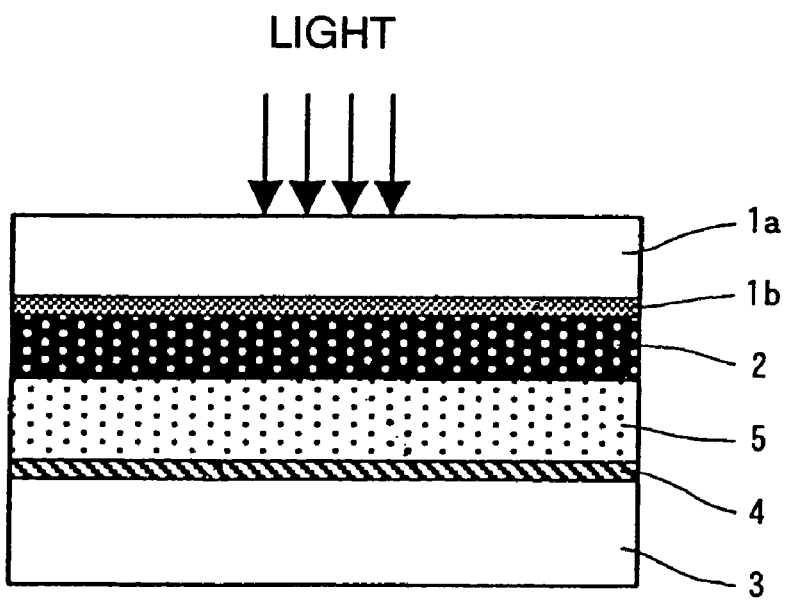
FIG. 2 is a cross sectional view of the main portion of the dye sensitized wet-type photoelectric conversion device according to the embodiment of the invention.

FIG. 2 shows the dye sensitized wet-type photoelectric conversion device in the case where, particularly, the transparent conductive substrate 1 is a substance obtained by forming a transparent electrode 1b onto a transparent substrate 1a.

As a transparent conductive substrate 1 (or the transparent substrate 1a and the transparent electrode 1b, a semiconductor layer 2 made of the semiconductor fine grain, a transparent substrate 3, and an electrolyte layer 5, proper materials can be selected from those mentioned above as necessary.

A manufacturing method of the dye sensitized wet-type photoelectric conversion device will now be described.

That is, first, the transparent conductive substrate 1 is prepared. Subsequently, a paste in which semiconductor fine grain exhibiting a photocatalyst activity and a binder made of a polymer compound are mixed is coated onto the transparent conductive substrate 1 so as to have a predetermined gap (thickness) by a method such as doctor blade method, spin coating method, dip coating method, or the like. Then, the semiconductor fine grain is sintered onto the transparent conductive substrate 1 by sintering it at a temperature of, for example, 400 to 500° C. for a period of time of, for example, 30 minutes to 1 hour. Thus, the semiconductor layer 2 made of the semiconductor fine grain is formed on the transparent conductive substrate 1. Subsequently, ultraviolet rays are irradiated to the semiconductor layer 2 and an organic substance remaining in the semiconductor layer 2 is dissolved and removed by the photocatalyst effect of the semiconductor fine grain. After that, the semiconductor layer 2 is dipped into the dye solution or the like, thereby allowing the dye to be adsorbed to the semiconductor fine grain. As such a dye, a proper one of those mentioned above can be selected as necessary.

On the other hand, the transparent substrate 3 is separately prepared and the platinum layer 4 is formed thereon.

The transparent conductive substrate 1 on which the semiconductor layer 2 has been formed and the transparent substrate 3 on which the platinum layer 4 has been formed are arranged in such a manner that the semiconductor layer 2 and the platinum layer 4 face each other at a predetermined interval, for example, a distance of 1 to 100 µm, preferably, 1 to 50 µm. A space in which the electrolyte layer 5 is sealed by using a predetermined sealing material is formed. The electrolyte layer 5 is injected into the space from an liquid injection port which has previously been formed. After that, the liquid injection port is closed. In this manner, the dye sensitized wet-type photoelectric conversion device is manufactured.

The operation of the dye sensitized wet-type photoelectric conversion device will now be described.

The light which has entered from the transparent conductive substrate 1 side by transmitting through the transparent conductive substrate 1 excites the sensitizing dye adsorbed on the surface of the semiconductor fine grain of the semiconductor layer 2, thereby generating electrons. The electrons are promptly transferred from the sensitizing dye to the semiconductor fine grain of the semiconductor layer 2. The sensitizing dye which lost the electrons receives the electrons from the ions of the electrolyte layer 5. The ions which have given the electrons receives the electrons again in the platinum layer 4 of the counter electrode. By such a series of processing steps, an electromotive force occurs between the transparent conductive substrate 1 electrically connected to the semiconductor layer 2 and the platinum layer 4. In this manner, the photoelectric conversion is performed.

As mentioned above, according to the embodiment, the paste in which the semiconductor fine grain exhibiting the photocatalyst activity and the binder made of the polymer compound are mixed is coated onto the transparent conductive substrate 1 and sintered, thereby forming the semiconductor layer 2, and after that, by irradiating the ultraviolet rays to the semiconductor layer 2, the organic substance remaining in the semiconductor layer 2 can be removed by the photocatalyst effect of the semiconductor fine grain. Therefore, the binding between the semiconductor fine grains in the semiconductor layer 2 is improved and the electrons can be easily moved between the semiconductor fine grain, so that the photoelectric conversion efficiency is improved. Since it is unnecessary to raise the sintering temperature and extend the sintering time in order to reduce the residual amount of the organic substance in the semiconductor layer 2, an increase in crystalline grain diameter can be prevented. Thus, a decrease in specific surface area can be prevented. Such a situation that the state changes to the state with the crystalline structure (in the case of titanium oxide, the rutile type) of the low photocatalyst activity is eliminated. The decrease in photoelectric conversion efficiency can be prevented. Further, since the sintering temperature necessary to form the semiconductor layer 2 can be suppressed to a low temperature, a plastic substrate which is more reasonable in price and more flexible than a glass substrate can be used as a transparent conductive substrate 1. In this manner, the reasonable dye sensitized wet-type photoelectric conversion device having excellent photoelectric conversion characteristics for a long time, particularly, the dye sensitized wet-type solar cell can be realized.

The dye sensitized wet-type solar cell will now be described as an embodiment of the dye sensitized wet-type photoelectric conversion device.

The dye sensitized wet-type solar cell is manufactured as follows. First, 1.5 wT % polyethylene glycol is further mixed to the titanium oxide paste and the resultant paste is stirred for one hour by a hybrid mixer and degassed. After that, it is left for 24 hours, thereby forming a titanium oxide paste.

Subsequently, the obtained titanium oxide paste is coated onto a gap of a size of 1 cm×1.5 cm and 175 µm of a fluorine doped conductive glass substrate having a sheet resistance of 15 Ω/cm$^2$ serving as a transparent conductive substrate 1 by the doctor blade method, and thereafter, the paste is dried at 50° C. for 30 minutes. After that, it is held at 450° C. for 30 minutes, the titanium oxide is sintered onto the fluorine doped conductive glass substrate, and the semiconductor layer 2 made of the titanium oxide fine grain is formed. A thickness of obtained semiconductor layer 2 is equal to about 13 µm.

The content of the organic in the semiconductor layer 2 made of the titanium oxide fine grain obtained as mentioned above are measured by an EDS (Energy Dispersive X-ray Spectrum). Thus, an amount of organic substance (content of carbon (C) component) contained in the semiconductor layer 2 is equal to about 1.4 atom %.

Figure 3:
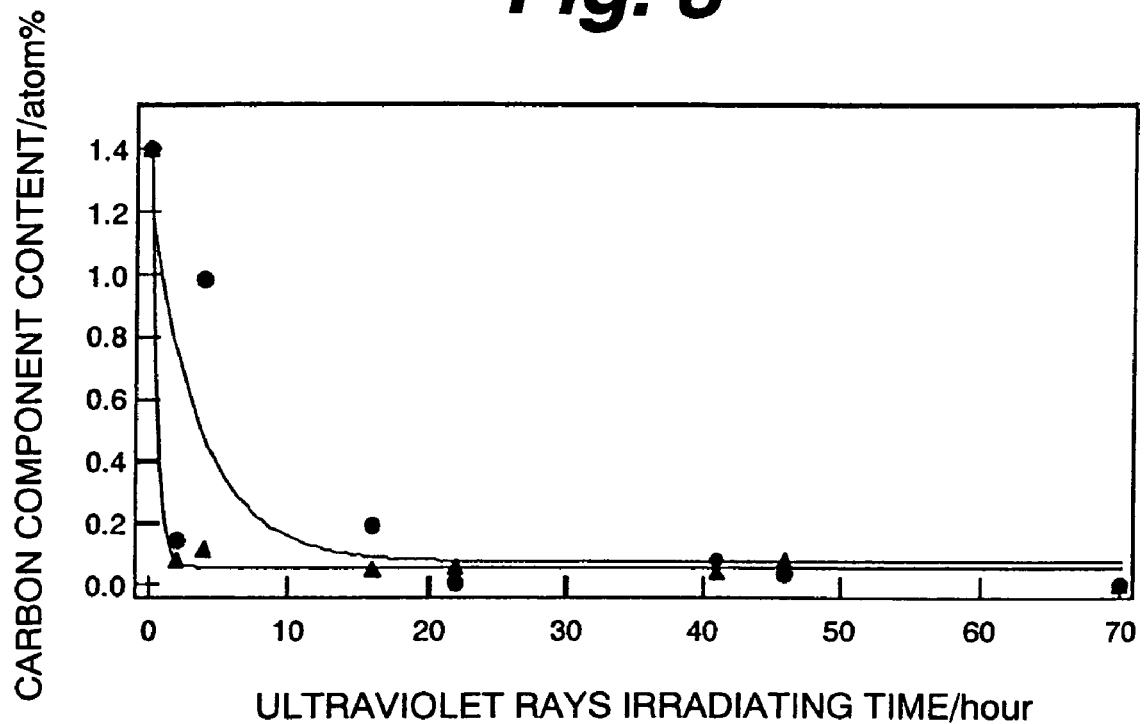
FIG. 3 is a schematic diagram showing a relation between a carbon component content of a semiconductor layer and an irradiating time of ultraviolet rays in the case where a paste in which titanium oxide fine grain and a binder made of a polymer compound are mixed is coated and sintered, thereby forming a semiconductor layer and, thereafter, ultraviolet rays are irradiated to the semiconductor layer in the embodiment of the invention.

Subsequently, the ultraviolet rays are irradiated to the obtained semiconductor layer 2 made of the titanium oxide fine grain for about 70 hours. The light source which was used is an extra-high pressure mercury lamp of 400 W. A change of the carbon component content of the semiconductor layer 2 to the irradiating time of the ultraviolet rays is as shown in FIG. 3. It will be understood from FIG. 3 that the carbon component content which has initially been equal to 1.4 atom % decreases gradually due to the photocatalyst effect of the titanium oxide with the elapse of the ultraviolet ray irradiating time, it is equal to 0.6 atom % or less by the irradiation of 5 hours, it is equal to 0.2 atom % or less by the irradiation of 10 hours, and almost of the carbon components in the semiconductor layer 2 are dissolved and extinguished (0.1 atom % or less) after the irradiation of 70 hours.

Subsequently, the device is dipped into a dehydrated ethanol solution in which cis-bis (isothiocyanate)-N,N-bis(2,2'-dipyridyl-4,4'-dicarboxylic acid)-ruthenium (II) dihydrate of 0.5 mM and deoxycholic acid of 20 mM are dissolved for 24 hours, thereby allowing the dye to be adsorbed into the semiconductor layer 2.

On the other hand, lithium iodide of 0.335 g, iodine of 0.0635 g, 4-tert-butyl pyridine of 0.34 g, ethylene carbonate of 2.5 g, and propylene carbonate of 2.5 g are mixed and stirred, so that the electrolyte is obtained.

After the semiconductor layer 2 made of the titanium oxide fine grain adsorbing the dye is coated with the electrolyte, it is combined with the platinum layer 4 formed on the transparent substrate 3 by the sputtering method so as to have a thickness of 100 nm, so that the dye sensitized wet-type solar cell is obtained.

Evaluation of the Photoelectric Conversion Efficiency

The photoelectric conversion efficiency is measured by a method whereby an electric clip is connected to the fluorine doped conductive glass substrate as a transparent conductive substrate 1 in each dye sensitized wet-type solar cell, an electric clip is connected to the transparent substrate 3 on which the platinum layer 4 has been formed, and a current and a voltage generated when the light is irradiated to the dye sensitized wet-type solar cell are measured by a current/voltage measuring apparatus. Upon irradiation of the light, AM1.5 is used as a light source and light intensity on the dye sensitized wet-type solar cell is set to 100 mW/cm$^2$.

Figure 4:
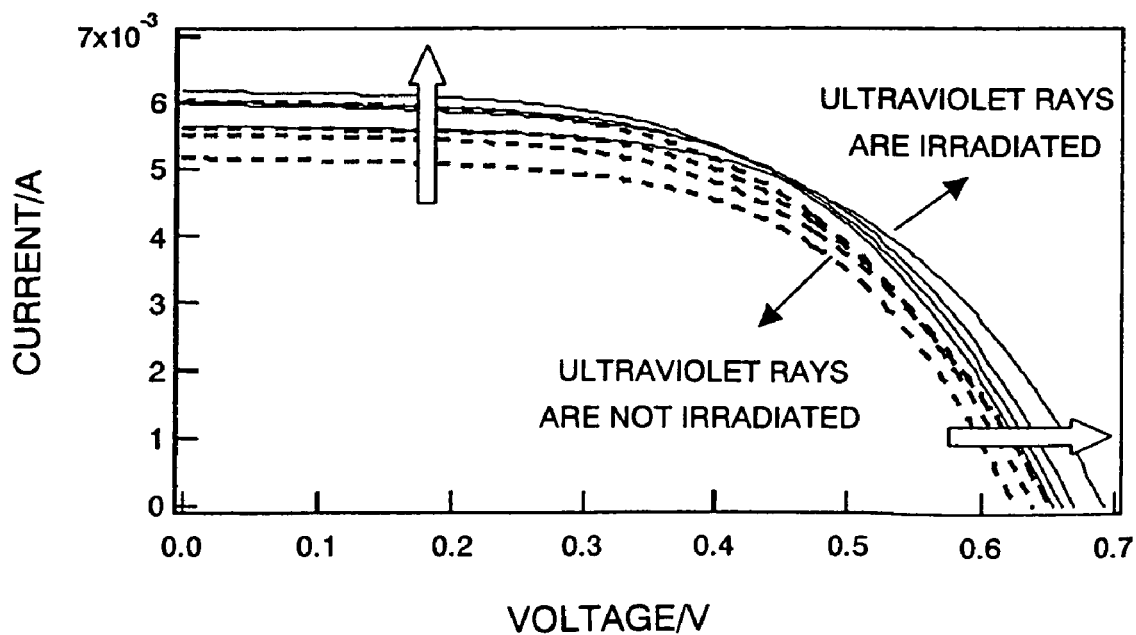
FIG. 4 is a schematic diagram showing current/voltage curves of the dye sensitized wet-type photoelectric conversion device in the case where the paste in which the titanium oxide fine grain and the binder made of the polymer compound are mixed is coated and sintered, thereby forming a semiconductor layer and, thereafter, the ultraviolet rays are irradiated to the semiconductor layer and in the case where the ultraviolet rays are not irradiated in the embodiment of the invention.

FIG. 4 shows measurement results of current/voltage curves in the case where the ultraviolet rays are irradiated to the semiconductor layer 2 made of the titanium oxide fine grain and in the case where they are not irradiated. The measurement results of every four samples are shown. It will be understood from FIG. 4 that when the ultraviolet rays are irradiated to the semiconductor layer 2 made of the titanium oxide fine grain, the photoelectric conversion efficiency is increased to about 4.4% from about 3.7 to 4.1%. It is considered that the reason why such results are obtained is that all of a short-circuit current, a release voltage, and a fill factor are increased.

It is considered that the reason why the photoelectric conversion efficiency is improved is that by irradiating the ultraviolet rays to the semiconductor layer 2 made of the titanium oxide fine grain, the residual organic substance is dissolved by the photocatalyst, so that the binding force between the titanium oxide fine grain is enhanced. It will be obviously understood that the process for irradiating the ultraviolet rays to the semiconductor layer 2 made of the titanium oxide fine grain is valid means for improving the photoelectric conversion efficiency of the dye sensitized wet-type photoelectric conversion device.

Although the foregoing embodiment and example of the invention have specifically been described above, the invention is not limited to the foregoing embodiment and example but many modifications based on the technical idea of the invention are possible.

For example, the numerical values, structures, shapes, materials, raw materials, processes, and the like mentioned in the foregoing embodiment and example are nothing but the examples and other numerical values, structures, shapes, materials, raw materials, processes, and the like different from them can be also used as necessary.

As described above, according to the invention, the paste in which the semiconductor fine grain and the binder made of the polymer compound are mixed is coated and sintered, thereby forming the semiconductor layer made of the semiconductor fine grain. After that, by irradiating the ultraviolet rays to the semiconductor layer, the organic substance remaining in the semiconductor layer is removed by the photocatalyst effect of the semiconductor fine grain. Thus, the residual organic substance in the semiconductor layer can be remarkably reduced. By sufficiently irradiating the ultraviolet rays, it is possible to realize the state where the residual organic substance does not exist substantially. Therefore, the binding between the semiconductor fine grain in the semiconductor layer is improved and the electron movement between them becomes easy and the photoelectric conversion efficiency is improved. since there is no need to raise the sintering temperature or extend the sintering time in order to reduce the residual amount of the organic substance in the semiconductor layer, the decrease in the photoelectric conversion efficiency can be also prevented. Since the sintering temperature necessary to form the semiconductor layer can be suppressed to a low temperature, the reasonable and flexible plastic substrate can be also used as a transparent conductive substrate or a substrate. Consequently, the photoelectric conversion device having excellent photoelectric conversion characteristics, more generally, the electronic apparatus having excellent characteristics can be obtained.

The invention claimed is:

1. A method of manufacturing a photoelectric conversion device, comprising:
   coating a transparent conductive substrate with a paste comprising a semiconductor fine grain and a binder made of a polymer compound;
   sintering the paste at a temperature of between approximately 400° C. to 500° C. to form a semiconductor layer made of the semiconductor fine grain, the semiconductor layer comprising an organic substance; and
   irradiating the semiconductor layer with ultraviolet rays for between approximately 4 and 70 hours to remove at least some of the organic substance in said semiconductor layer using a photocatalyst effect of the semiconductor fine grain.

2. The method of claim 1, wherein the semiconductor fine grain comprises a plurality of kinds of semiconductor fine grain exhibiting photocatalyst activity.

3. The method of claim 1, wherein said semiconductor fine grain having a photocatalyst effect is made of titanium oxide, zinc oxide, or strontium titanate.

4. The method of claim 1, wherein said polymer compound is a polymer compound having a viscosity improving effect.

5. The method of claim 1, wherein said polymer compound is polyethylene glycol or polystyrene.

6. The method of claim 1, wherein irradiating the semiconductor layer with ultraviolet rays for between approximately 4 and 70 hours comprises irradiating the semiconductor layer with ultraviolet rays for between approximately 10 and 70 hours.

7. The method of claim 6, wherein irradiating the semiconductor layer with ultraviolet rays for between approximately 10 and 70 hours comprises irradiating the semiconductor layer with ultraviolet rays for between approximately 30 and 70 hours.

8. The method of claim 1, wherein irradiating the semiconductor layer with ultraviolet rays for between approximately 4 and 70 hours comprises irradiating the semiconductor layer with ultraviolet rays for a time sufficient to remove enough of the organic substance such that a content of a carbon component in said semiconductor layer after said irradiation by ultraviolet rays is equal to or less than 1 atomic %.

9. The method of claim 8, wherein irradiating the semiconductor layer with ultraviolet rays for between approximately 4 and 70 hours comprises irradiating the semiconductor layer with ultraviolet rays for a time sufficient to remove enough of the organic substance such that the content of the carbon component in said semiconductor layer after said irradiation by ultraviolet rays is equal to or less than 0.3 atomic %.

10. The method of claim 1, wherein irradiating the semiconductor layer with ultraviolet rays for between approximately 4 hours and 70 hours comprises irradiating the semiconductor layer with ultraviolet rays for between approximately 50 and 70 hours.

11. The method of claim 10, wherein irradiating the semiconductor layer with ultraviolet rays comprises irradiating the semiconductor layer with ultraviolet rays for approximately 70 hours.

12. The method of claim 1, wherein sintering the paste at a temperature of between approximately 400° C. to 500° C. comprises sintering the paste for between approximately 30 minutes and one hour.

13. A method of processing a semiconductor layer formed by sintering a paste coated on a substrate, the paste comprising a semiconductor fine grain and a binder made of a polymer compound, the method comprising:

irradiating the semiconductor layer with ultraviolet rays for approximately 70 hours.

14. A method of manufacturing a semiconductor layer, comprising:

forming a paste comprising a semiconductor fine grain and a binder made of a polymer compound;

coating a substrate with the paste;

sintering the paste between approximately 400° C. and 500° C., thereby forming the semiconductor layer comprising the semiconductor fine grain and an organic substance, irradiating the semiconductor layer with ultraviolet rays for between approximately 4 and 70 hours to remove, by using a photocatalyst effect of said semiconductor fine grain, at least some of the organic substance in said semiconductor layer.

* * * * *